United States Patent [19]

Simms

[11] 4,279,629
[45] Jul. 21, 1981

[54] FIRE PREVENTION FILTER FOR CHIMNEYS AND THE LIKE

[76] Inventor: Donald S. Simms, 43 Lincoln St., Greenfield, Mass. 01301

[21] Appl. No.: 121,364

[22] Filed: Feb. 14, 1980

[51] Int. Cl.³ .................. B01D 39/12; B01D 46/42
[52] U.S. Cl. ........................... 55/307; 55/422;
55/478; 55/503; 55/508; 55/526; 55/DIG. 20;
55/DIG. 43; 110/119; 110/148; 110/163;
126/285 R; 126/292
[58] Field of Search ............. 55/307, 422, 478, 481,
55/508, 503, DIG. 20, DIG. 43, 526; 110/119,
148, 163; 126/285 R, 292, 297

[56] References Cited

U.S. PATENT DOCUMENTS

| 218,643 | 8/1879 | Rumely | 55/DIG. 20 X |
|---|---|---|---|
| 235,263 | 12/1880 | Lindsay | 126/297 |
| 239,895 | 4/1881 | Vincent | 126/297 |
| 374,436 | 12/1887 | Wakeman | 126/297 X |
| 517,471 | 4/1894 | Martin | 55/503 X |
| 660,678 | 10/1900 | Bowling | 55/DIG. 20 X |
| 796,434 | 8/1905 | Klein | 55/DIG. 20 X |
| 907,769 | 12/1908 | Fuller | 55/DIG. 20 X |
| 1,001,478 | 8/1911 | Sweet | 126/292 |
| 1,439,813 | 12/1922 | Hance | 126/292 |
| 1,442,561 | 1/1923 | Feely | 126/292 |

Primary Examiner—Kathleen J. Prunner
Attorney, Agent, or Firm—Leonard S. Michelman

[57] ABSTRACT

This invention is concerned with a removable filter to prevent the buildup of Creosote in chimneys which become vulnerable to fires.

A hollow enclosure means that is adapted to connect between the chimney and the fire source has within it a support for mounting a filter. The filter is made of a special metal, is knitted with small openings therein permitting the flow of smoke but at the same time to reduce the particles into a minute white ash. The filter acts as a continuous burn reactor. A door is provided whereby the filter can be easily removed from the hollow enclosure and cleaned so that it can be used for an indefinite period without replacement.

14 Claims, 8 Drawing Figures

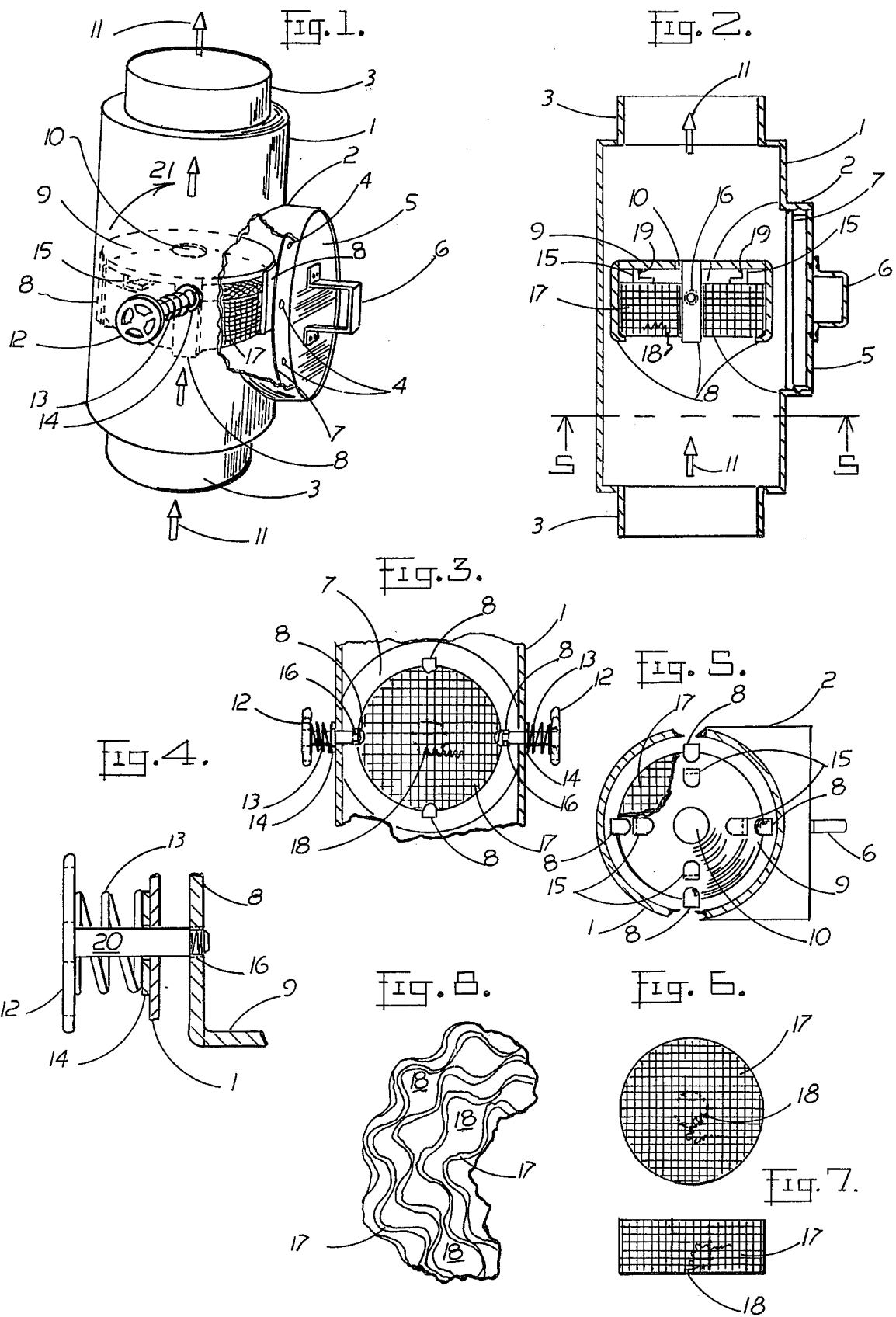

FIRE PREVENTION FILTER FOR CHIMNEYS AND THE LIKE

This invention is concerned with an article of manufacture conceived for the purpose of eliminating the danger from fire of the buildup of creosote in chimneys.

With the energy shortage and the inflationary cost of fuels, many people have been burning coal and wood in their woodstoves, furnaces and fireplaces.

A continuous amount of burning of wood and coal causes a buildup of the carbon and the creosote on the surfaces of the inside of the chimney.

After a large buidup, these particles become heated and catch on fire.

This is quite dangerous to the building in which the chimney or stovepipe is constructed, and in many instances will cause a conflagration of the entire house or building.

It is therefore an object of this invention to provide a filtering means for preventing the buildup of the carbon and creosote in the inside surfaces of chimneys.

It is also an object of the within invention to provide a filter which can be cleaned and/or changed with simplicity.

It is yet another object of the within invention to provide a filter housing within the chimney pipe in which the filter is inserted that may be attached between the source of the burning and the chimney.

It is yet an additional object of this invention to provide a combination filter within a housing which has adjustments for removing the filter and adjustments for connecting the housing to the flue or stovepipe and to the burning source.

These and other objects may be more readily understood by reference to the following specification and to the drawings, in which:

FIG. 1 is a perspective and diagrammatic view in elevation of the assembly including the filter and the housing therefore.

FIG. 2 is a crosssection elevation of the housing and the filter of the view shown in FIG. 1.

FIG. 3 is a exploded view of the invention showing the filter assembly in the vertical position.

FIG. 4 is a side elevation diagramatic exploded view of the damper adjusting assembly.

FIG. 5 is a diagramatic section view taken along the view of line 5—5 in the view of FIG. 2.

FIG. 6 is a top elevation view of the filter.

FIG. 7 is a side elevational view of the filter.

FIG. 8 is a diagramatic exploded view of a filter, wound and knitted wire mesh structure.

The housing 1 will be hereinafter referred to as the filter holder enclosure, and/or housing. It is cylindrical in shape made of approximately 24 gauge steel. The embodiment as manufactured is approximately 8 inches in diameter. It is a single size enclosure for all connections. It has a cleanout door flange 2 extending from its peripheral surface as can be seen in the view of FIG. 1.

The enclosure housing 1 has at its bottom and top portions a reduced neck size in order to adapt for connection with stovepipes of varying dimensions. There are detents 4 circumscribing the surface of the door flange 2, abutting the filter cleanout door 5.

The door 5 is circular in shape and is adapted to fit securely within the inner periphery of the cleanout door flange 2. There is a pull handle 6 mounted on the filter cleanout door 5.

On the door 5 there is a cover inner seal 7 which is for the purpose of filling the air space and gap developed from the connecting flange.

The stainless steel filter 17 which is made of wire mesh is in the shape of a cylinder which is cut off at the top and the bottom, having a plurality of small openings 18 therein.

A construction of the filter 17 can be readily understood by reference to FIGS. 6 and 7, and the openings 18, therein.

The filter 17 is supported by the damper plate extender legs 8. There is also a cast iron damper plate 9 which is connected to the opposite end of the damper plate extending legs 8.

This construction can be seen in the view of FIG. 4 as well as the other views.

There are bolt holes 16 in the damper plate extender legs 8 below the cast iron damper plate 9.

Threaded within this opening 16 is a damper adjusting bolt forming a handle 12. The bolt having a shank 20 is maintained in a stationary position under the tension of a compression spring 13 which is helical in shape.

There is a washer 14 which is located at the surface of the enclosure. The shank 20 of the bolt passes through the washer 14 and an opening in the enclosure 1 for contact and threaded engagement with the filter holder assembly comprised of the damper plate extender legs 8 and the cast iron damper plate 9. There is in the damper plate 9 and opening 10 which is a safety hole to allow the exhaust gasses to pass through the cast iron damper plate 9. The opening 10 is aligned with the openings 18 in the filter 17.

In order to keep the filter 17 is spaced relation at the distance shown in the view of FIG. 2 from the damper plate 9, there are filter lift pads which are metal legs upon which the filter 17 sits. This prevents the filter 17 from making contact with the damper plate 9 so that the filter 17 can maximize a clear flow pattern and also utilize a maximum working service area to filter out the debris.

In operation, the housing enclosure 1 is fitted to a chimney pipe at the reduced neck 3. If the stovepipe is too large, then reduction pipes have to be fastened at neck 3 so that the pipes are interconnected hermetically to insure that smoke and debris will not escape therefrom. The lower neck 3 in the view of FIG. 1 is connected to the source of the smoke making fire such as wood or coal.

The upper portion of the enclosure assembly 1 is also of a reduced neck and is connected to the chimney pipe which stands away from the fire source and out into the atmosphere.

Again, the same mechanical procedure is applied if the chimney pipe leading out to the atmosphere cannot fit the neck portion 3 of the top of the view shown in FIG. 1.

The arrows 11 show the flow of the debris and smoke through the damper plate safety opening 10 and through the filter 17.

The arrow 21 in FIG. 1 shows the direction that the damper assembly controlled by the handle 12 can be rotated 360° and the view of FIG. 3 shows the damper assembly in a vertical position.

In operation, the filter is located in a horizontal position as shown in the views of FIG. 1 and FIG. 2.

The smoke and debris enter the lower portion of the damper plate 1 at the reduced neck portion 3 and flow in the direction of the arrow 11 into the chamber which is biased by the filter 17.

The air is permitted to pass around the filter to some extent between the surfaces of the plate 9 and the damper plate extender legs 8 as well as through the openings 18 in the filter 17 and through the opening 10 in the damper plate 9.

The damper is controlled as described by the handle 12 which is connected to the shank 20 that connects at 16 with the damper plate 9.

The action of the spring 13 permits the mechanism to be located into different positions so that the filter could be in a lateral position or could be located upside down or even sideways. The position of the filter-damper holder will regulate the draft condition with the closed position for maximum filtering results once the fire is going efficiently.

The spring action of the helical spring 13 prevents the pull of gravity which insures the filter and plate 9 to maintain their desired position.

The arrangement shown in FIG. 4 does lock the filter 17 into the position desired by the operation of the handle 12.

The filter 17 is a knitted type of construction made from stainless steel. It is a mesh weave (as shown in FIG. 8) and has both a large surface area of wire and a high percentage of free space. It guides a tortuous path to the flow of gases.

The knitted wire mesh filter 17 operates on the impingement principle, which is to say that a particle, when trying to break through the tortuous path created by the mesh, will lose its velocity by bouncing from wire to wire until it settles on the mesh itself. This action is carried one step further, because due to the extreme temperature of the operational filter, particles are consumed and converted into minute particles of white ash and reduced as a potential fire danger. This filter is therefore a continuous burn reactor.

This characteristic of the filter 17 is analogous to a self-cleaning element in the stack or fire itself.

The filter 17 is recycleable, and easily drops into position over and over.

Filter 17 is either air blown clean or washed out and then reused. Another function of the damper filter assembly as described is to act as a spark arrester. The high surface area of the filter 17 absorbs heat at a high rate, cooling the "flame front". This quenches the flame or resultant sparks.

The filter 17, with periodic cleaning, will reduce chimney or fuel cleanings and assist in the elimination of fires in the chimney. The efficiency measured by the air flow resistance can be from 50% to 99%, depending upon how often the filter 17 is cleaned.

In order to clean the filter 17, it is only necessary to pull off the door 5 by the handle 6. The filter 17 is then snapped out from the pads 15.

The pads 15 are welded at 19 to the damper plate 9.

The washing can take place by any type of stainless steel cleaning agent or by a conventional oven cleaner.

In consideration of the foregoing, I claim:

1. An assembly for eliminating the buildup of creosote in chimneys comprising a hollow enclosure means having means at its top and bottom so as to be adapted to be connected between a stove pipe and a chimney, a door means located in said hollow enclosure, a damper plate adjacent said door means having a plurality of legs extending downwardly therefrom, a filter having a plurality of openings therein and being supported by said legs, an opening in the middle area of said damper plate, lift pads mounted on said damper plate to space said filter from said damper plate, said openings in said filter being aligned with the opening in said damper plate, and means for rotating said damper plate within said hollow enclosure means.

2. An assembly for eliminating the buildup of creosote in chimneys as recited in claim 1 wherein the means for adapting the hollow enclosure means to connect between a stove pipe and a chimney comprises a neck of reduced cross section at both the top and bottom of said hollow enclosure means whereby a pipe whose outside dimension is of the same inner dimension of said enclosure means is able to make friction contact therewith.

3. An assembly for eliminating the buildup of creosote in chimneys as recited in claim 2 wherein said filter is made of a stainless steel wire mesh.

4. An assembly for eliminating the buildup of creosote in chimneys as recited in claim 3 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flanges whereby the detent means maintain said door in a fixed and secure position, said flange being located opposite the damper plate and the filter supported thereon whereby the filter may be easily removed from said enclosure means through the door means.

5. An assembly for eliminating the buildup of creosote in chimneys as recited in claim 2 wherein said damper plate is mounted on the shank of a bolt with a head, said bolt being secured to said hollow enclosure means through an opening therein and in contact with said downwardly extending legs, a spring means circumscribing said shank of the bolt between its head and the outer surface of said enclosure means whereby the damper plate supporting the filter may be rotated into various fixed positions.

6. An assembly for eliminating the buildup of creosote in chimneys as recited in claim 5 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flanges whereby the detent means maintain said door in a fixed and secure position, said flange being located opposite the damper plate and the filter supported thereon whereby the filter may be easily removed from said enclosure means through the door means.

7. An assembly for eliminating the buildup of creosote in chimneys as recited in claim 2 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flange whereby the detent means maintain said door in a fixed and secure position, said flange being located opposite the damper plate and the filter supported thereon whereby the filter may be easily removed from said enclosure means through the door means.

8. An assembly for eliminating the buildup of creosote in chimneys as recited in claim 1 wherein said filter is made of a stainless steel wire mesh.

9. An assembly for eliminating the buildup of creosote in chimneys as recited in claim 8 wherein said damper plate is mounted on the shank of a bolt with a head, said bolt being secured to said hollow enclosure means through an opening therein and in contact with said downwardly extending legs, a spring means circumscribing said shank of the bolt between its head and the outer surface of said enclosure means whereby the damper plate supporting the filter may be rotated into various fixed positions.

10. An assembly for eliminating the buildup of creosote in chimneys as recited in claim 9 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flange whereby the detent means maintain said door in a fixed and secure position, said flange being located opposite the damper plate and the filter supported thereon whereby the filter may be easily removed from said enclosure means through the door means.

11. An assembly for eliminating the buildup of creosote in chimneys as recited in claim 8 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flange whereby the detent means maintain said door in a fixed and secure position, said flange being located opposite the damper plate and the filter supported thereon whereby the filter may be easily removed from said enclosure means through the door means.

12. An assembly for eliminating the buildup of creosote in chimneys as recited in claim 1 wherein said damper plate is mounted on the shank of a bolt with a head, said bolt being secured to said hollow enclosure means through an opening therein and in contact with said downwardly extending legs, a spring means circumscribing said shank of the bolt between its head and the outer surface of said enclosure means whereby the damper plate supporting the filter may be rotated into various fixed positions.

13. An assembly for eliminating the buildup of creosote in chimneys as recited in claim 12 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flange whereby the detent means maintain said door in a fixed and secure position, said flange being located opposite the damper plate and the filter supported thereon whereby the filter may be easily removed from said enclosure means through the door means.

14. An assembly for eliminating the buildup of creosote in chimneys as recited in claim 1 wherein said door means comprises a flange extending from said hollow enclosure means, an inner seal on the inner periphery of said flange, detent means extending inwardly on said flange away from said periphery, and an outer door having a handle thereupon and being adapted to fit within said inner periphery of said flange whereby the detent means maintain said door in a fixed and secure position, said flange being located opposite the damper plate and the filter supported thereon whereby the filter may be easily removed from said enclosure means through the door means.

* * * * *